Feb. 5, 1952 F. DOSTAL 2,584,562
APPARATUS FOR TIMING HAIRSPRINGS
Filed July 2, 1948 2 SHEETS—SHEET 1

INVENTOR
FRANK DOSTAL
BY
ATTORNEY

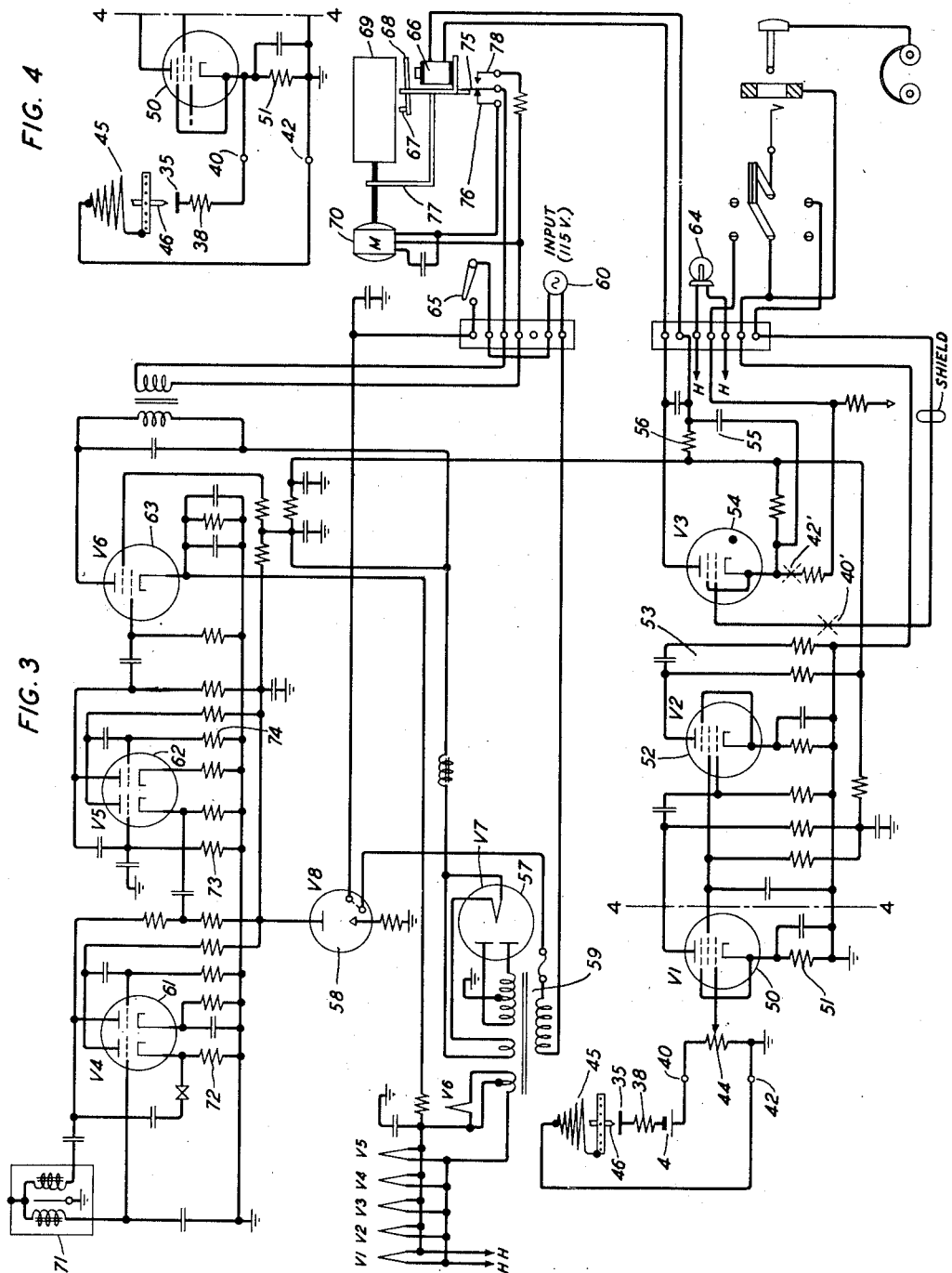

Patented Feb. 5, 1952

2,584,562

UNITED STATES PATENT OFFICE 2,584,562

APPARATUS FOR TIMING HAIRSPRINGS

Frank Dostal, Great Neck, N. Y., assignor to American Time Products, Inc., New York, N. Y., a corporation of Delaware Application July 2, 1948, Serial No. 36,685

4 Claims. (Cl. 73—6)

This invention relates to hairspring timers and more specifically to devices for measuring the vibratory periods of hairsprings for watches, clocks and other mechanisms using hairsprings.

The object of this invention is to provide a testing and adjusting device for the combination of a balance wheel and hairspring whereby the length of the hairspring may be suitably matched to the weight of the balance wheel so that the vibratory period of the combination is of a desired magnitude.

In accordance with the invention, the vibratory period of a hairspring with its attached balance wheel is measured by imparting thereto an axial oscillation while suspending the hairspring at the free end thereof. The axial oscillations simultaneously produce vertical oscillations causing the lowermost pivot of the balance staff to make successive contacts with an electrical conductor connected in a counting circuit operating a visual indicator or recorder. The recorder or indicator will demonstate whether or not the period is as required. If the period should not be as required, the length of the hairspring, from its point of attachment to the balance wheel to the point of suspension, is varied and the test repeated until substantially the desired period is obtained. Upon obtaining the desired period, the hairspring is cut off at the point of suspension.

The instant invention, in an illustrative embodiment, will now be described with reference to the accompanying drawings, in which:

Figure 1, in an elevational view, mostly in section, discloses the holding jig for suspending the hairspring with its attached balance wheel;

Figure 1A is an enlarged sectional view of the tweezer sleeve;

Figure 1B a side perspective view of the tweezers employed in the holding jig;

Figure 3 is a circuit schematic of the testing machine disclosing one form of connection of the holding jig to its input; and Figure 4 is another form of connecting the holding jig to the testing machine, and replaces that portion of Figure 3 shown to the left of line 4—4 thereof.

Figure 1:
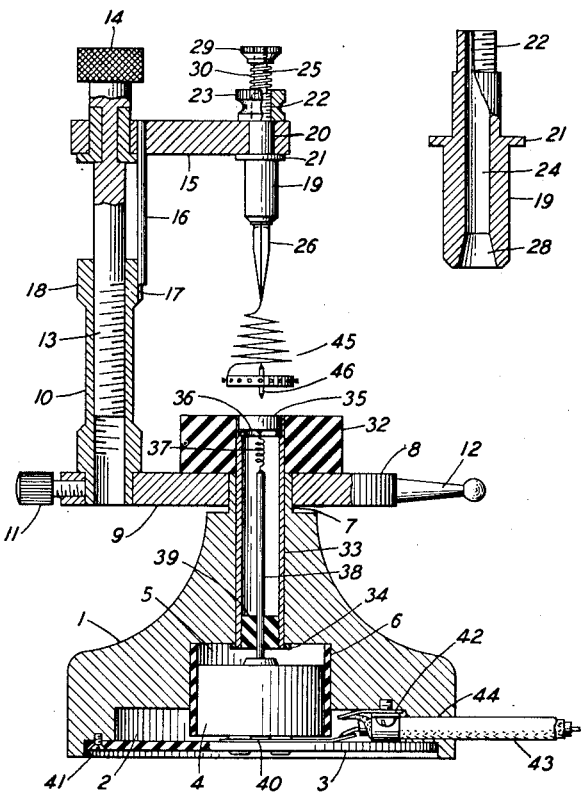
Figure 1A:
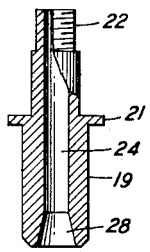
Figure 1B:
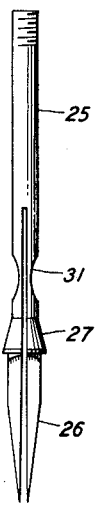
Figure 2:
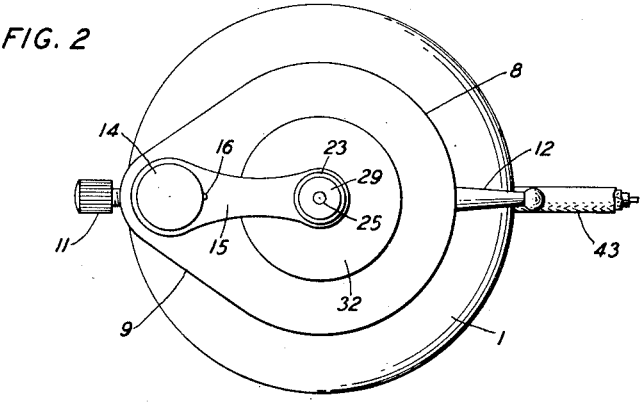
Figure 2 is a top view of the jig of Figure 1.

The holding fixture shown in Figures 1 and 2 comprises a metallic base 1 having a hollow portion 2, the bottom of the base being closed by an insulating plate 3. The plate clamps a battery 4, housed within the formed recess 5 of the hollow portion, and insulated therefrom by the insulating sleeve 6, into position so that the battery is in the hereinafter described electrical circuit. Integral with the upper portion of the base, a cylindrical portion 7 has positioned thereabout, with a loose sliding fit, a metallic plate 8 essentially annular but having an enlarged region 9. An upright hollow member 10 is removably supported in the enlarged region and is clamped thereto by removable knurl-headed screw 11. At substantially diametrically opposite the enlarged region, the plate 8 carries a horizontally extending knob or lever 12 by means of which the plate may readily have imparted to it an oscillatory motion about the cylindrical base portion 7. The upright member 10 is threaded internally at its lower portion to receive the bolt 13, externally threaded at its lower end and having the knurled top 14. An arm 15 extends laterally from the bolt 13 so that its free end is substantially aligned vertically with the central region of base 1. The guide rod 16, projecting from the arm 15 and parallel to the bolt 13, freely slides vertically through a groove 17 in the upper end 18 of the upright member 10 and prevents the arm 15 from rotating with the rotation of bolt 13. The threading on the lower end of the bolt extends along the bolt for that portion thereof projecting downwardly beyond the lower end of the guide rod 16. Thus, in the practical intended use of the fixture, the threaded portion of the bolt does not show. The free end of the arm 15 carries a formed sleeve 19 which is inserted vertically through port 20, and has integral shoulder 21 and a threaded end portion 22 on which the knurled nut 23 is screwed, thus holding the sleeve 19 against displacement vertically while permitting rotation in port 20. The bore 24 of sleeve 19 is of such diameter as to permit the elongated rod portion 25 of the tweezers 26 to be easily inserted. The tweezers have a conical shoulder 27 of such taper as to fit into the tapered end 28 of the bore 24, and upon upward motion of the rod portion 25, firmly to close the tweezers. The upper end of the rod portion 25 extends, when in position, substantially above the nut 23, and its extreme end has affixed thereto, as by threading, the button 29. The compression spring 30 is positioned about the rod portion 25 between the button 29 and the nut 23. Upon depression of the button 29, the conical shoulder disengages from the tapered end 28 of the bore 28 and the tweezers tend to open, which tendency is aided by the thinned portion 31 in each arm of the tweezers somewhat above the conical shoulder 27 and in the centrally split region of rod portion 25. Obviously on releasing the pressure on button 29, the spring 30 forces the button upward, and as the rod portion 25 moves up the conical shoulder again engages the tapered bore and the tweezer arms are again brought together, firmly holding any object, such as the hairspring end, between them.

An annular disk 32 of insulating material is mounted rigidly on the plate 9 and is fitted over the upper end of the metallic sleeve 33 extending into the recess 5 in the base. Sleeve 33 rotates with plate 8 and disk 32, being prevented from downward motion by them, and is locked against upward movement by a metallic ring or disk 34 affixed to its small projection into recess 5. A plate 35, preferably of lead, supported by an insulating ring 36 on the sleeve 33, is snugly fitted into the bore of insulating disk 32 with its upper surface substantially coplanar therewith. By means of the spring connector 37, the lead plate is electrically connected to a resistor 38 positioned within the bore of sleeve 33 and insulated therefrom by insulator bushing 39. The lower end of resistor 38 connects with one pole of battery 4, the spring connector being provided to assist in assuring an intimate contact. The other pole of battery 4 is engaged by terminal 40 carried by the insulator bottom plate 3 when in position and affixed to the base, as by screws 41. The terminal 42, at any convenient place in the hollow portion 2, is connected to one conductor of the cable 43, the terminal 40 being connected to the other conductor thereof. Cable 43 is brought out from within the hollow base portion 2 through the port 44. Cable 43 may be of any desired two conductor construction, but is preferably a coaxial construction in which the outer conductor is a cylindrical shield through the central portion of which the other conductor passes longitudinally.

It will be noted that lead plate 35, spring connector 37, resistor 38, battery 4 and terminal 40, which are connected in series, are electrically insulated from the metallic base 1 by disk 32, ring 36, bushing 39, sleeve 6, bottom plate 3 and the insulation of cable 43. Furthermore, since the tweezers 26, sleeve 19, arm 15, stud 13, upright member 10, plate 8, cylindrical portion 7 and base 1 are all of metal, there is a complete metallic path from the tweezers to the terminal 42, that is, a path which is electrically conducting, and which path is wholly independent of, and insulated from, the electrical path from the lead plate 35 to the terminal 40 just above described. The plate 35 is preferably of lead in order to obtain some damping effect when the lower pivot of the staff of a hairspring-balance wheel suspended by the tweezers strikes thereagainst, as below described, thus preventing a bouncing which would introduce non-uniformity in the oscillation of the hairspring-balance wheel.

The free spring end of the hairspring-balance wheel combination 45, of which the period is to be measured, is inserted into the tweezers 26 by depressing the button 29, feeding a portion of the spring end into the open tweezers, and releasing the button so that the tweezers firmly grasp the spring. The weight of the hairspring-balance wheel combination will distend the hairspring vertically. The height of the pivot 46 above the lead plate 35 is now adjusted, by raising or lowering the arm 15 by rotating the knurled top 14 of the bolt 13, so that the pivot will strike the plate on manual oscillation of the plate 8 by means of lever 12. Manually oscillating the plate 8, preferably at about the desired rate of vibration of the hairspring-wheel, for even a few oscillations imparts to the tweezers supported end of the hairspring a rotary reciprocating motion which causes the hairspring-wheel combination 45 also to vibrate vertically, whereby the lower pivot 46 of its staff will strike the plate 35 at the end, substantially, of each downward stroke. These oscillations of the hairspring-wheel will continue for some time, sufficient to make the required measurement, after the oscillatory movement of the plate 8 has been stopped.

On connecting the terminals 40 and 42 to a time measurement and recording circuit, as hereinafter described, the striking of the lead plate closes the circuit between such terminals and produces an electrical pulse which is used to measure the rate. It will be noted that electrical contact is made through the very high resistance of the resistor 38 to prevent damage to the very delicate pivot 46 of the balance staff.

In its original manufacture, the hairspring is knowingly made longer than will ultimately be required. In adjusting it in length until the required period is obtained, or approximately obtained, the preferable procedure is to work with successively decreasing spring lengths, that is, the initial tests will usually show too long a period. By grasping the hairspring successively further and further from its free end for the successive tests, unnecessary bending and distortion of the spring, which would inevitably follow if the reverse procedure were observed, are both avoided. Upon noting a correct period for a given spring-wheel combination, the spring is cut at the point where it was held in the tweezers during the favorable test, leaving a little excess, however, for attaching the spring to the watch body.

One form of appropriate measuring and recording circuit to which the holding fixture may be connected is shown by way of example in Figure 3. The terminals 40 and 42 are connected across the coupling resistor 44 in the grid circuit of the pentode 50, which with pentode 52 comprises a two stage resistance coupled amplifier. The amplified signals pass through a high pass filter network 53, provided with an earphone jack to permit monitoring of the amplified signals, to the thyratron tube 54 which assures uniform operation of the recording mechanism in that the signals transmitted by it are of uniform wave form independent of the signal form impressed on its grid. The thyratron tube is connected as an oscillator by providing a condenser 55 in the output circuit thereof, the condenser 55 being charged through the resistance 56 by direct current supplied from the full wave rectifier 57, connected through transformer 59 to the A. C. supply line 60. As shown at V1, V2, ... V8, HH, the transformer 59 also supplies the required filament heating currents for the pentodes 50 and 52, thyratron 54, multivibrator tubes 61 and 62, rectifier 57, amplifier 63, and pilot light 64, as well as the plate currents for the tubes 50, 52, 54 and 63. When the grid and plate voltages of the thyratron tube 54 are of proper value, a current flows in the plate circuit until the voltage across the condenser 55 has dropped to a value lower than that required to operate the tube. As soon as the plate current in tube 54 ceases to flow, the condenser 55 immediately begins to charge through the resistance 56. A recurrent discharge of the condenser is thus obtained, the frequency of which depends on the values of the resistance 56 and the condenser. By adjusting these values to produce a frequency slightly lower than the desired frequency of the hairspring-balance wheel combinations to be measured, thyratron 54 is selfpriming at the moment the amplified pulse, from the hairspring-balance wheel closing the circuit by striking the plate 35, is impressed on the grid of the tube. The output pulses due to the discharge of the condenser 55 energize the printing magnet 66, causing the stylus 67 carried by the lever 68 actuated by the magnet to strike against the printing drum 69, through for example an inked ribbon, thus marking the removable record chart held on the printing drum.

The printing drum 69 is rotated by the motor 70 at a precisely constant speed, for example, of five revolutions per second. Motor 70, in the illustrative embodiment, is a 60 cycle synchronous motor, the frequency of its supply current being held accurately thereat by a constant frequency source comprising essentially the multivibrators 61 and 62, the 240 cycle tuning fork 71, and the amplifier 63. The constant voltage supply for the plates of tubes 61 and 62, as also for electrically driving the tuning fork 71, is obtained from the line source 60 through the voltage regulator tube 58 which fires on closing switch 65. The resistances 72, 73 and 74 in the multivibrator circuits 61 and 62 are of such values, for example, respectively 1,500, 25,000 and 75,000 ohms, that the frequency applied to the control grid of the amplifier 63 is 60 cycles. The output from amplifier 63 is applied through a transformer to the motor 70 driving the latter at exactly the rated speed provided the switch 75 is positioned, as shown in Figure 3, so that it engages its left-hand contact 76. It will be noted that the relay 66 and its armature lever 68 are mechanically carried on the bracket 77, which is driven from left to right as shown in Figure 3 by gearing, not shown, as the printing drum 69 is rotated. A stop projects from the bracket 77 so that when the bracket reaches its furthest right position, the stop engages switch 75 and disengages the latter from its left contact 76, thus stopping the rotation of the printing drum, while closing a circuit through the right contact 78 to return the bracket 77 to its furthest left position, in preparation for the next test and recording. Obviously, the furthest left and right positions of the bracket 77 are so determined that in the respective positions the printing stylus 67 is at, respectively, the start and end of the record chart on the drum.

The type of record chart used on the printing drum may be of the known kind having spaced lines parallel the path of travel of the recording magnet 66 along the drum, which path is parallel to the axis about which the drum is rotated. The distance along the cylindrical surface of the drum between the spaced lines of the chart is made to represent the same time variation between each pair of lines, for example five seconds per twenty-four hours. Since in the illustrative embodiment, as above stated, the drum is rotated at five revolutions per second, it follows that if the hairspring-balance wheel under test makes five oscillations per second, it will record a series of dots all of which are on the same straight line of the chart, or on a line parallel to the printed lines on the chart, since between each dot two fifths of a second elapse during which the printing drum has made two complete revolutions. If the series of recorded dots made by the stylus when testing a hairspring-wheel combination with apparently the same period, it is apparent that between the successive dots the printing drum has made less than two complete revolutions, less than two-fifths of a second have elapsed, and hence the number of oscillations per second of the hairspring-wheel under test is greater than five. Similarly if the series of dots slants downwardly on the record from left to right, the number of such oscillations is less than five per second, for here the drum has made more than two complete revolutions between successive dots. Obviously with the particular speed of rotation of the drum, any multiple or sub-multiple of five oscillations per second will produce lines of recorded dots parallel to the printed lines on the chart. The actual value of the oscillations per second of the hairspring-balance wheel is readily determinable by a count of the deviation distance above or below the initial dot of a record for the elapsed time between recording the initial dot to recording the dot whose deviation is counted.

In the testing and cutting of hairspring-balance wheels it will frequently not be necessary to determine the exact length of the hairspring at which the oscillations are precisely the required number, for example five per second; an approximation of such value will suffice. Thus, as it is intended usually to start the test with the particular hairspring-balance wheel having too long a period, the record produced in the initial test will slope downwardly from left to right, when using the illustrative drum speed and record chart above described. Thereupon on shortening the spring length, and renewing the test, the new record should slope less downwardly from left to right and if now, or on succeeding tests with further shortened lengths of the particular hairspring, the slope tends to disappear or perhaps even to reverse slightly, the approximately proper length of the hairspring has been located.

In the alternative mode of connecting the holding jig to the recording circuit shown in Figure 4, it will be noted that the battery 4 is first removed from the recess in the base of the holding fixture and the resistor 38 is connected directly to the terminal 40. In this instance, the terminals 40 and 42 are connected across the cathode resistor 51 of the pentode 50. With such connection, upon the pivot 46 striking the plate 35 there will be an abrupt change in the voltage drop across the resistor 51, causing a pulse which is amplified and applied to the thyratron 54, producing the same effects as above described in the recording circuit.

It is to be understood that the foregoing holding fixture and recording circuit are by way of illustration of my invention and that various modifications thereof and therein may be made without departing from the spirit of my invention.

What I claim is:

1. Apparatus for determining the period of vibration of an electrically conductive spiral spring and attached mass assembly, comprising an electrical circuit, an electrically conductive means in the circuit for suspending the spring and mass assembly at the free end of the spiral spring, an electrically conductive base positioned at a predetermined distance below the suspending means and aligned therewith, a source of electric potential connected serially in the circuit between the suspending means and the base, the said distance being such that the suspended spring and mass assembly at rest does not touch the base and when vibrating axially just engages the base at its maximum downward throw to permit a pulse of current to flow from the source, means for imparting limited rotary motion to the suspending means, and an electrical pulse indicating circuit connected in parallel to the electrical circuit.

2. Apparatus for determining the period of vibration of an electrically conductive spiral spring and attached balance wheel comprising an electrical circuit, an electrically conductive, mechanically rotatable, clamp in the circuit, an electrically conductive disc in the circuit positioned at such distance from the clamp that on suspension in the clamp of the spring and wheel assembly at the free end region of the spring the assembly at rest does not touch the disc and on vibration just touches the disc at the lowermost throw portion of the assembly vibration, means for imparting rotary motion to the clamp, a source of electric potential in the circuit and indicating means responsive to the pulses of potential from the source flowing in the circuit when the vibrating assembly touches the disc on rotation of the clamp.

3. Apparatus according to claim 2 in which the means for imparting rotary motion to the clamp comprises a base, a plate rotatable about the base, a bracket supported on the rotatable plate, the clamp being positioned in the bracket and projecting downwardly from the bracket toward and in substantial alignment with the central region of the base, the base, plate, and bracket being electrical conductors, and in which said electrically conductive disc is centrally positioned on the rotatable plate and insulated therefrom.

4. Apparatus according to claim 2 in which the means for imparting rotary motion to the clamp comprises a base, a plate rotatable about the base, a bracket supported on the rotatable plate, the clamp being positioned in the bracket and projecting downwardly from the bracket toward and in substantial alignment with the central region of the base, the base, plate and bracket being electrical conductors, said electrically conductive disc being centrally positioned on the rotatable plate and insulated therefrom, and in which the source of potential comprises a battery, a resistor being serially in the circuit to the battery, and the battery and resistor are positioned within and insulated from the base.

FRANK DOSTAL.

REFERENCES CITED

The following references are of record in the file of this patent:

UNITED STATES PATENTS

| Number | Name | Date |
| --- | --- | --- |
| 406,655 | Logan | July 9, 1889 |
| 2,019,769 | Poole | Nov. 5, 1935 |
| 2,113,825 | Caldwell et al. | Apr. 12, 1938 |
| 2,155,646 | Fetter et al. | Apr. 25, 1939 |
| 2,158,725 | Lawson et al. | May 16, 1939 |
| 2,476,761 | Olinger | July 19, 1949 |